(12) United States Patent
Korman et al.

(10) Patent No.: US 6,308,887 B1
(45) Date of Patent: Oct. 30, 2001

(54) MULTI-TRANSACTIONAL ARCHITECTURE

(75) Inventors: Bruce R. Korman, Los Angeles; Darryl Jesse Bergman, Studio City, both of CA (US)

(73) Assignee: Cash Technologies, Inc., Los Angeles, CA (US)

( * ) Notice: Subject to any disclaimer, the term of this patent is extended or adjusted under 35 U.S.C. 154(b) by 0 days.

(21) Appl. No.: 09/347,069

(22) Filed: Jul. 2, 1999

Related U.S. Application Data

(63) Continuation of application No. PCT/US98/25541, filed on Dec. 2, 1998.
(60) Provisional application No. 60/067,123, filed on Dec. 2, 1997.

(51) Int. Cl.[7] .................................................. G06F 17/60
(52) U.S. Cl. .............................................. 235/379; 902/4
(58) Field of Search ............................... 235/379; 705/35, 705/43, 44, 17; 902/8, 4, 25, 26, 27; 350/25, 24

(56) References Cited

U.S. PATENT DOCUMENTS

| | | | |
|---|---|---|---|
| 5,350,906 | 9/1994 | Brody et al. | 235/379 |
| 5,365,046 | 11/1994 | Haymann | 235/380 |
| 5,457,305 | 10/1995 | Akel et al. | 235/379 |
| 5,531,640 | 7/1996 | Inoue | 453/17 |
| 5,564,546 | 10/1996 | Molbak et al. | 194/216 |
| 5,659,165 | 8/1997 | Jennings et al. | |
| 5,742,905 | * 4/1998 | Pepe et al. | 455/461 |
| 5,799,767 | 9/1998 | Molbak | 194/217 |
| 5,878,141 | * 3/1999 | Daly et al. | 380/25 |
| 5,984,178 | * 11/1999 | Gill et al. | 235/379 |

FOREIGN PATENT DOCUMENTS 2188467A 9/1987 (GB).

OTHER PUBLICATIONS

Japanese Patent Abstract, Publication No. JP03–063795, Publication Date Mar. 19, 1991.
International Search Report, Dated Jan. 26, 1999.

* cited by examiner

*Primary Examiner*—Karl D. Frech
(74) *Attorney, Agent, or Firm*—O'Melveny & Myers LLP

(57) ABSTRACT

An automated transaction machine network which supports multiple-destination transactions and a variety of communication protocols and/or message formats including standard and proprietary protocols and/or message formats. The automated transaction machine network includes a Super-ATM (Automatic/Automated Transaction Machine) which interfaces with a variety of peripherals: standard-ATM peripherals and/or sensors, and nonstandard ATM peripherals and/or sensors. The Super-ATM can process traditional ATM transactions, non-traditional ATM transactions, and Point-of-sale (POS) transactions.

51 Claims, 3 Drawing Sheets

MULTI-TRANSACTIONAL ARCHITECTURE

CROSS REFERENCE TO RELATED APPLICATIONS

This application is a continuation of co-pending PCT application, application No. PCT/US98/25541, filed Dec. 2, 1998, priority of which is hereby claimed under 35 U.S.C. §120. The PCT application, application No. PCT/US98/25541, and this application as well, claims priority under 35 U.S.C. §119(e) to provisional application, application No. 60/067,123, filed Dec. 2, 1997.

FIELD OF THE INVENTION

The present invention relates generally to a network architecture for multi-transactional processing, and more particularly, to automated transaction terminals with multi-transactional capability.

BACKGROUND OF THE INVENTION

Although conventional automated teller machines (ATM) are convenient because they provide access to funds in a multitude of locations and after normal banking hours, and enable customers to avoid the long lines that are typical in savings & loans and banks, the convenience is limited. The convenience is limited because conventional ATMs do not provide customers services beyond normal banking transactions. What is needed is an ATM with multi-transactional capability which would be capable of accepting currency, debit cards, credit cards, smart cards, and sell products and services.

In conventional ATMs, ATM events are single-destination transactions; i.e., a transaction would be routed to either the ATM or credit card issuer only. In the Super-ATM structure, multiple-destination transactions are supported where one transaction can result in different messages being routed to any number of destinations.

Previously, only published, industry standard protocols/message sets were supported for all communication along the transaction path, limiting transaction types to those defined in ISO 8583. In the Super-ATM system, an unlimited number and combination of "standard" and proprietary protocols or message sets can be utilized to facilitate a transaction, and ISO 8583 is only used for that portion of a message that requests authorization from an ATM or credit card issuer.

In the past, bank and regional network software were not capable of receiving credit card (POS) trasactions through ATMs, because, among the other things, the fee settlement paradigm for standard ATM transaction (issuer pays routing costs) directly opposes that for POS transactions (acquirer pays costs). In contrast, the Super-ATM and the host (or "back end") record and report ATM transactions and POS transactions separately for settlement purposes, appearing as if originated by separate ATM or POS terminals. The protocol used between a Super-ATM and the host is proprietary.

SUMMARY OF THE INVENTION

A preferred embodiment of the present invention includes an automated transaction terminal, by way of example, an ATM with capabilities not previously provided (Super-ATM), that may process any number or subset of a variety of transactions. The automated transaction terminal communicates with a variety of service providers in the protocols and message formats of the service providers. The automated transaction terminal, in response to a first user input may execute a transaction with a first service provider by sending a message to the first service provider in the first service provider's message format, and the automated transaction terminal, in response to a second user input, may execute another transaction with a second service provider by sending a message to the second service provider in the second service provider's message format.

In another embodiment of the present invention, the automated transaction terminal, in response to one user input, may execute a transaction with several service providers by sending messages to the service providers in their respective message formats.

In yet another embodiment of the present invention, the automated transaction terminal may send a message to a service provider which then returns a message to the automated transaction terminal, whereupon the automated transaction terminal, based on the return message, automatically selects another service provider to execute a transaction with and sends a message to the selected service provider.

A number of embodiments of the present invention are particularly applicable to machines that provide an array of services, including standard ATM services, and services not previously available on an ATM, through a new proprietary ATM network architecture that overcomes limitations of the ATM/Point-of-sale (POS) industry International Standards Organization (ISO) 8583 standard message set. The machine can also perform kiosk functions that do not require critical network support.

The essential differences between the Super-ATM architecture and the conventional ATM network architecture are: (1) the Super-ATM architecture supports multiple-destination transactions rather than supporting only single-destination transactions; (2) the Super-ATM architecture supports a variety of protocols rather than supporting only industry standard protocols; and (3) the Super-ATM architecture supports POS transactions in addition to ATM transactions rather than supporting only ATM transactions; (4) the Super-ATM architecture processes transactions asynchronously; and (5) the Super-ATM architecture can interface with networks that have not previously been interfaced.

In a preferred embodiment of the present invention, the Super-ATM system can process messages asynchronously and in parallel. Existing ATM and POS networks do not optimize multiple network events, whereas the Super-ATM system does multi-threading and multi-state processing. The Super-ATM includes a host computer system that manages and executes events simultaneously.

A preferred embodiment of the present invention is directed to an integrated financial transaction terminal that satisfies the need for greater user convenience by allowing the user to perform a variety of transactions, from paying bills to making purchases, utilizing a variety of payment means, including coins, currency, credit cards, debit cards, smart cards, and the like.

The multi-transaction Super-ATM machine offers a significant improvement over conventional ATMs by offering a user a variety of payment options. The user can effect a desired transaction utilizing a variety of payment means. The user can use any of the following or combination of the following payment means: currency, credit card, debit card, smart card, etc. In addition, a user may elect to receive a receipt for cash or credit towards purchases at a store. A user may also, among other transactions, pay bills, buy lottery tickets, buy catalog merchandise, buy event tickets, buy movie tickets, buy airline tickets, deposit the money in a bank account, etc.

An attractive feature of preferred embodiments of the present invention is the ability to provide the general public access to electronic financial transactions, rather than restricting electronic transactions only to those with credit cards. A user can complete a variety of transactions electronically. For example, purchase of airline tickets could now be accomplished without the use of a credit card.

It is understood that other embodiments of the present invention will become readily apparent to those skilled in the art from the following detailed description. The described embodiments of the invention are illustrative of the best modes contemplated for carrying out the invention. As will be realized, the invention is capable of other and different embodiments and its details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

These and other features, aspects, and advantages of the present invention will become better understood with regard to the following description, appended claims, and accompanying drawings where:

DETAILED DESCRIPTION

Figure 1:
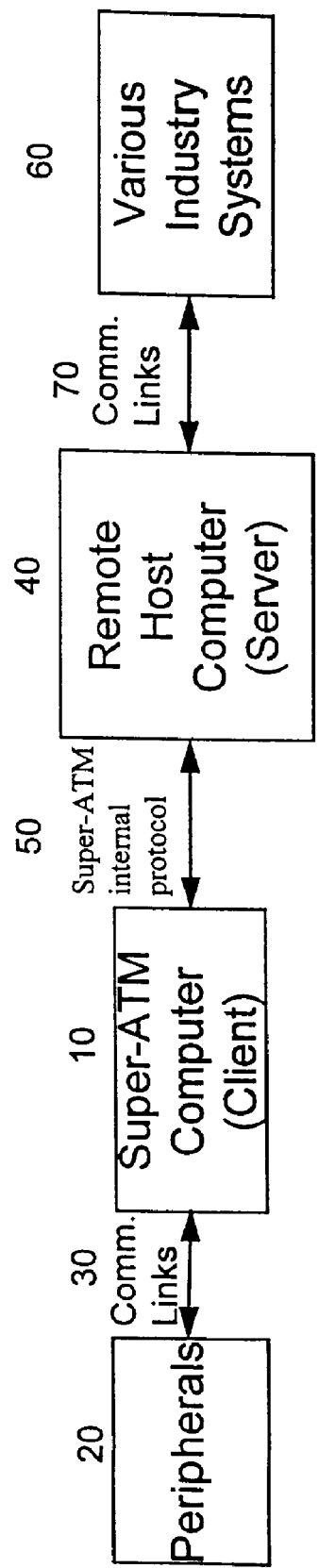
FIG. 1 shows the block diagram for the overall Super-ATM network architecture.

In a preferred embodiment of the present invention, a Super-ATM network is configured with a client/server structure in which Super-ATM clients pass a new proprietary message set to the driving host, which in turn parses and converts the message set into any number of "standard" messages (i.e. those using a published protocol such as ISO 8583, etc.), Electronic Data Interchange (EDI) messages, or nonstandard proprietary messages (those which are sent to billers, phone time providers, etc. who may not utilize any published standard). FIG. 1 shows the block diagram for the overall Super-ATM network architecture. Communication between the Super-ATM machine 10 and its various peripherals 20 is via communication links 30 appropriate to the particular peripherals. In a preferred embodiment, the communication links between the Super-ATM and its peripherals is via electronic buses. Communication between the Super-ATM machine and the Remote Host Computer (Server) 40 is implemented via a Super-ATM internal protocol 50. Communication between the Remote Host Computer and the various industry computer systems 60 is implemented via a variety of communication links 70, a communication link for each service provider. The various industry computer systems 60 may utilize ISO 8583, proprietary, and/or other standard protocols and message formats.

Once the client message is parsed and converted, the driving host routes the standard and nonstandard messages it has created to any network(s) necessary to carry out the Super-ATM-initiated transaction. For example, if a user initiated a bill payment transaction using an ATM card as the method of payment, the following steps would occur: (i) The Super-ATM (client) sends its complex proprietary message to the driving host; (ii) The host (or one or more of its components) parses the ATM information from the proprietary message, formats it as an ISO 8583 message, routes the message to the ATM network and completes the balance authorization using standard ISO events and communication over the ATM network; (iii) The host parses the information needed by the biller (account information, etc.) and creates an EDI or other message, using a format prearranged with the biller, to be communicated to them in real time, near time or in a periodically transmitted batch file; and (iv) The Super-ATM shows a success message to the user and issues a receipt which confirms the completion of the transaction. Step (iv) will often precede step (iii) where the host is not performing real time transactions with the biller but rather storing information for later transmission. The steps above can be applied to any ATM/POS product or service offered on the Super-ATM machine, changing the steps as required for different items or services being offered on the machine.

Synchronous or asynchronous communications between the client and the host over standard telephone, digital, leased or other phone lines or a wireless network are used. Formatting transmissions in Transmission Control Protocol/Internet Protocol (TCP/IP) readily permits the use of the Internet as a medium between client and host, though other communications protocols can be used. Transmissions to be sent over a wireless network are formatted according to the network provider's specifications.

If the Internet is employed, the machine can directly dial an Internet service provider for net access, utilize a leased line or connect to a server local to the machine which in turn transmits over the Internet to the driving host (main server).

The system supports fully remote operation of the client machine by the host as well as remote configuring and downloading new software to the machine. Host and client applications may be written in a form of Java to permit easier software updates at the client.

Advertising, public service announcements and other messages may be updated "on the fly" based upon information provided by or stored about the machine's current user.

Key information about every transaction and every user can be stored at the host and, when needed, at the client. When a user returns to use again any machine on the network, he/she can avoid reentering account or other "user preferences" information stored from a prior transaction by entering some identifying information.

Figure 2:
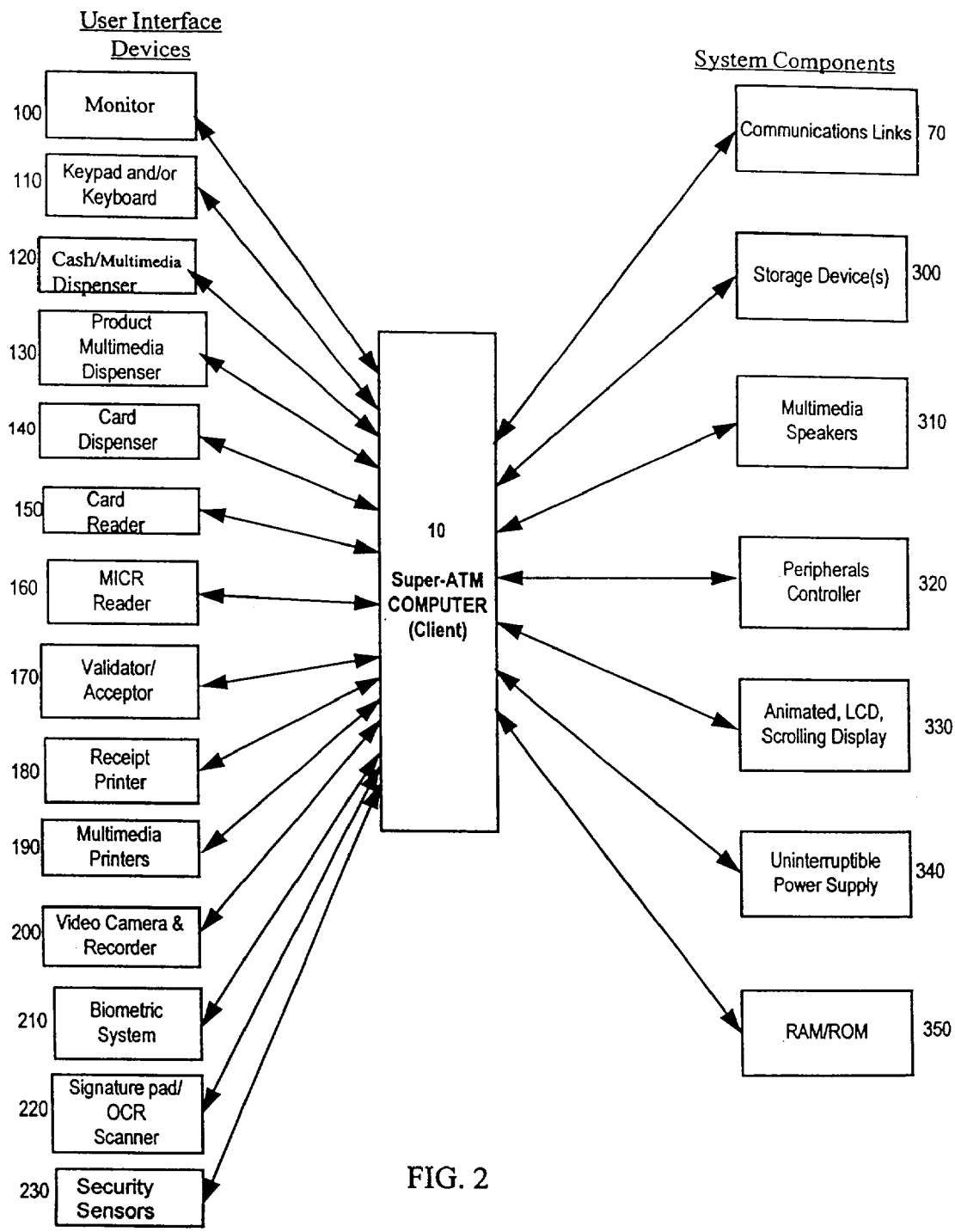
FIG. 2 shows an embodiment of the Super-ATM machine components architecture and component interaction of an embodiment of the invention.

FIG. 2 shows an embodiment of the Super-ATM machine 10 components architecture and component interaction of an embodiment of the invention. An embodiment may include any combination of the user interface devices. The monitor 100 is a major means of communication between the user and the Super-ATM machine and may include either a monochrome, color touch-screen, or non-touch-screen monitor. The monitor 100 may display messages and/or user menus. The display messages may provide information to the user, such as interest rates on consumer loans, or may indicate choices which the user has to choose from. Traditional choices include whether to deposit money into a checking or savings account. Non-traditional choices may include the purchase of theater tickets or payment of a utility bill. While a touch screen monitor requires tactile responses from the user for interaction with the Super-ATM, a Super-ATM with a non-touch-screen monitor elicits responses from the user via a keypad and/or keyboard 110. The keypad 110 may be a symbolic keypad and/or an alphanumeric keypad. A symbolic keypad has symbols indicating user actions. The advantage of a symbolic keypad over an alphanumeric keypad is that depressing a keypad symbol which represents an action requires one symbol key depression, whereas the same action would require many key depressions on an alphanumeric keypad. Of course, a keypad and/or keyboard may be used in conjunction with a touch-screen monitor. Ergonomic studies may indicate the optimum allocation of user functions between a touch-screen monitor and a user keypad and/or keyboard. The keypad and/or keyboard may also include braille characters. Virtual input devices may also be used, such as an on-screen virtual keyboard or keypad, as well as other input devices known in the art.

In a preferred embodiment of the invention, the keypad is an encryption PIN pad. The keys which are depressed at the PIN pad and/or keyboard are encrypted into messages to prevent eavesdroppers from utilizing entered PIN information. In the described embodiment, the encryption algorithm uses the ANSI Data Encryption Standard (DES) and complies with International Standards Organization (ISO) requirements. DES is an example of single-key cryptography. In another embodiment, public-key cryptography which uses both a public key and private key, is used to encrypt/decrypt messages. Key management options include, but are not limited to: Master/Session, Derived Unique Key Per Transaction (DUKPT), and Dynamic Key Per Transaction. Other input devices may include trackballs, accupoints, etc., to locate the cursor on the monitor.

The Super-ATM has multimedia support. In a preferred embodiment, sound capability and full motion video is supplied via formats complying with the Motion Pictures Experts Group (MPEG) audio and video compression standard. In other embodiments, sound capability is supplied via RealAudio formats or other audio formats, and fill motion video is supplied via Joint Photographic Experts Group (JPEG) formats, Motion JPEG (MJPEG) formats, QuickTime formats, or other video formats.

The cash/multimedia dispenser 120 doubles as both a cash and a multimedia dispenser. In addition to dispensing cash, the cash/multimedia dispenser can dispense paper-based multimedia items such as tickets, money orders, coupons, stamps, utility bills, etc. The cash/multimedia dispenser can also dispense non-paper-based multimedia items such as tokens. The product multimedia dispenser 130 does not dispense paper-based multimedia items like the cash/multimedia dispenser does, but dispenses products such as cassette tapes, CD ROMs, laser disks, DVDs, and microchips which have a memory store capacity. These type of products include audio and video products such as music and videos. The card dispenser 140 dispenses cards with or without an integral bar code. For example, the card dispenser may dispense prepaid phone cards. The ATM/credit/debit card reader 150 can read a magstripe, bar code, or smart chip card. The ATM/credit/debit card reader 150 may come with or without smart chip read/write capability. The card reader with smart chip write capability can increase/decrease the stored dollar amount on a smart card chip. Other kinds of information may be written to the smart card chip depending upon the smart card application. An embodiment of the invention may include a Magnetic Ink Character Recognition (NICR) reader 160 which decodes the magnetic ink characters printed at the bottom of checks. The MICR reader converts information from checks or utility bills to digitized information which is then used in processing the user transaction. The MICR reader enables the Super-ATM to cash checks. The Super-ATM contacts the Financial Service Provider (FSP) indicated by the check. If the FSP authorizes the debit from the checking account, then the Super-ATM dispenses the amount of money authorized for debit. The Validator/Acceptor 170 validates for acceptance any deposited cash and/or multimedia items. Deposited cash may be credited towards a bank account, whereas coupons may deposited to apply to the purchase of an item such as a theater ticket. In a preferred embodiment, several printers are used. The receipt printer may be a direct (e.g. dot-matrix) or thermal receipt printer 180. The multimedia printers 190 may print tickets, money orders, coupons, stamps, tokens, utility bills, etc. which are dispensed to the ATM user by the multimedia dispenser. Printed tickets include tickets for events, for air flights, for the lottery, etc. A multimedia printer may be a laser or thermal forms printer. The video camera and video recorder 200 are used for security purposes, to record the initiator of an ATM transaction and the situation surrounding the transaction.

An embodiment may use a biometric system 210 to identify/verify a Super-ATM user. Biometrics involves the measurement of an ATM user's biological traits, such as physical traits and behavioral traits. The biometric system 210 may measure an individual's fingerprints, hand-geometry, facial appearance, speech, physical movements, keyboard typing rhythms, eye features, and even body odor. The biometric system 210 may include self-contained input devices/sensors and/or may be used in conjunction with the other Super-ATM input devices. The biometric system 210 may include a fingerprint scanner, hand scanner, eye scanner, facial scanner, voice sensor, infrared camera, keyboard sensors, and/or olfactory sensor. In a preferred embodiment, the Super-ATM biometric system 210 is a facial measurement security system whereby the thermal aspects of a user's face is measured and compared to a prestored thermal signature of the user's face.

An optional computer keyboard for user input may be embedded into the Super-ATM. An optional signature pad 220 utilizing a light pen, tactile pen, or other writing instrument, may also be embedded into the Super-ATM along with an Optical Character Recognition (OCR) scanner. The Super-ATM screen may be web enabled wherein the Super-ATM's display software utilizes the Hypertext Markup Language (HTML), JAVA™, a JAVA™-derived language, web-based language, or other distributed language.

In a preferred embodiment, the Super-ATM includes a computer which communicates with and controls the peripheral devices. The computer may utilize Visual Basic, C, C++, assembly language, and/or other software to send and receive the data necessary to control the peripheral devices. In another embodiment, the Super-ATM may use special integrated circuits on interface cards to send and receive the data necessary to control the peripheral devices. The peripherals are attached and controlled via a bus. In a preferred embodiment, a Universal Serial Bus (USB) is used. The USB allows for many peripheral devices to be connected to the Super-ATM at one time and allows for "hot-swapping" of peripherals, i.e., attaching and detaching peripherals without having to shut down the Super-ATM. Since many new personal computers are shipped with a USB port, many personal computers can be the host platforms for ATM diagnostic software. Other embodiments of the invention may use a Controller Area Network (CAN) Bus, a Small Computer Systems Interface (SCSI) Bus, an Industry Standard Architecture (ISA) bus, an Extended Industry Standard Architecture (EISA) bus, a Peripheral Component Interconnect (PCI) bus, a Micro Channel bus, a Personal Computer Memory Card International Association CardBus (PCMCIA), a VersaModule Eurocard (VME) bus, an IEEE 1394 bus, an ANSI bus, an IEEE bus, or any proprietary bus. An embodiment may also utilize the Intelligent I/O (I2O) bus architecture developed by the I2O Special Interest Group.

The peripherals are configured to use parallel, serial, USB, CAN bus, etc., TTL logic or other control to match PC capabilities. Some peripherals require additional custom or vendor-supplied electronics interfaces to be found within or outside the PC.

The communications links 70 may include Plain Old Telephone Service (POTS) (also known as Public Switched Telephone Network (PSTN)), Integrated Services Digital Network (ISDN), Fiber Distributed Data Interface (FDDI), Digital Subscriber Line (DSL) and its derivatives, T1, E1, cable, wireless or other modem(s). PSTN is used to carry analog voice data over copper wires. ISDN is used to send voice, video, and data over digital phone lines. FDDI is used to send digital data over fiber optic cable. DSL is a digital connection over existing copper wires between the Super-ATM and a telephone central office. Both T1 and E1 run over copper wires, but require digital repeaters. An embodiment may use an RS-232 serial connection at the physical layer. TCP/IP may be used as the protocol for Internet connections. An embodiment might include a direct network connection, such as an Internet connection using either shielded or unshielded twisted pair, coaxial or fiber optic cables. Other communication links might include an optical connection, a wireless RF modem connection, a cellular modem connection, or a satellite connection.

The storage device(s) 310, such as a magnetic storage device, enable electronic data capture for either an ATM user or for ATM maintenance purposes. An ATM user may rather have a statement of his bank account on a transportable disk (which the ATM user can then upload to an electronic device) rather than in paper form. When troubleshooting an ATM, diagnostic results can be output to a transportable disk for later analysis. Security sensors 230 sense whether there is any tampering with the Super-ATM equipment. Alarms are triggered when tampering is sensed. The alarms can be aural and/or electronic. An electronic alarm would trigger a message to be sent to the Super-ATM administrator. The speakers are not only used to sound an alarm, but can also be used for providing the ATM user with ATM user directions, information, and prehearings of music products.

Other system components include multimedia speakers with associated sound circuitry 310, a peripheral controller 320, an animated, LCD, scrolling display 330, an uninterruptible power supply 340, and random access, read only, or other memory storage 350. The peripheral controller controls the processing of the input and output of the various peripherals.

The various elements of the Super-ATM work together to carry out. non-traditional ATM transactions. For example, an ATM user who is interested in seeing a theater event, but does not know what theater events are occurring and whether there is a good seat available could find out this information via a Super-ATM. The user would indicate interest in the theater by navigating the user menus that are displayed on the Super-ATM monitor. The theater information would be downloaded to the Super-ATM and the monitor would display the various events scheduled. The user selects the desired event upon which the monitor displays the available seats. The user can then select the desired seat via the Super-ATM input devices. If the user deposits the appropriate cash and/or coupon for the event, then the desired ticket or ticket proxy (e.g. reservation for a ticket) will be dispensed to the user.

The network architecture permits any type of network-based kiosk-oriented product or service to be offered, including bill payment, real-time activated prepaid phone card dispensing, loyalty cards for retail stores, smart card issuance and recharging, smart chip recharging (for the new prepaid cellular phones and similar devices), customized and/or interactive advertising, event tickets, airline tickets, money orders, dispensing of postage stamps, paid or promotional coupons and gift certificates, world wide web browser, charitable donations, etc.

The Super-ATM's Validator/Acceptor 170 permits the payment for products, services, bills or recharging of smart cards with cash. It also permits "verified deposits," wherein a customer can obtain immediate credit for currency deposits rather than wait two or three days for their available balance to be updated while an envelope deposit is counted.

The operation of the Super-ATM machine is controlled by a central computer housed in the Super-ATM machine. In a preferred embodiment of the present invention, the Super-ATM computer 10 shown in FIG. 1 is an Intel based or equivalent PC system, coupled to a number of peripheral devices.

The user may request a receipt redeemable for cash or merchandise. Another alternative includes the user conducting electronic transactions such as applying the exchange value of cash and/or coins towards a purchase. Possible items purchased include movie tickets, lottery tickets, event tickets, airline tickets, etc. Another alternative includes applying the exchange value of cash and/or coins toward payment of a bill, such as power, gas, water, phone, cable or credit cards. Other embodiments may offer other transactions and purchases, such as catalog items, pre-paid phone cards, money orders or other electronic transactions.

In a preferred embodiment, the electronic transactions are effected by contact with a Super-ATM machine. The computer in the Super-ATM machine, referred to for convenience as the Super-ATM PC, is networked to a host computer, remote from the Super-ATM. The network connection is preferably a dedicated direct connection, but may also be a standard modem connection, a wireless RF modem connection, a cellular modem connection, or any other network connection, such as an Ethernet connection. An Internet connection may also be utilized, using TCP/IP or other Internet protocol, through a dial-up connection, or an ISDN connection, or a dedicated Internet connection such as a cable modem or other digital or optical connection, or any other Internet connection available.

The PC in the Super-ATM and the remote host computer 40 may use a distributed client/server architecture, to enable "on the fly" changes through changes made to the host computer software. All software and firmware in the Super-ATM may be updated or changed either remotely from the host or locally with an electronic device linked directly to the Super-ATM PC. For example, initial settings and configurations may be set at a Super-ATM by the Super-ATM connecting to the host. Any subsequent changes in the configuration for each connected Super-ATM could be made at the host, with a scheduled date for such changes to take place. Each time a Super-ATM contacts the host, it looks for changes to configuration files. The Super-ATM would automatically poll the host for changes, update its own software, and the change would take effect on the scheduled date. By way of example, one or many Super-ATMs could be programmed to begin accepting certain tokens on a certain date, all from modifications made in the host software. Of course, these changes could also be made locally at each Super-ATM PC by means of a connection between an electronic device, such as a laptop or hand held computer, and the Super-ATM PC. In a preferred embodiment, the distributed client/server architecture is JAVA-based. An embodiment may utilize other languages such as C++. An embodiment may utilize standard technologies such as Internet Inter-ORB Protocol (IIOP), HTML, and Object Management Group (OMG) protocols.

Figure 3:
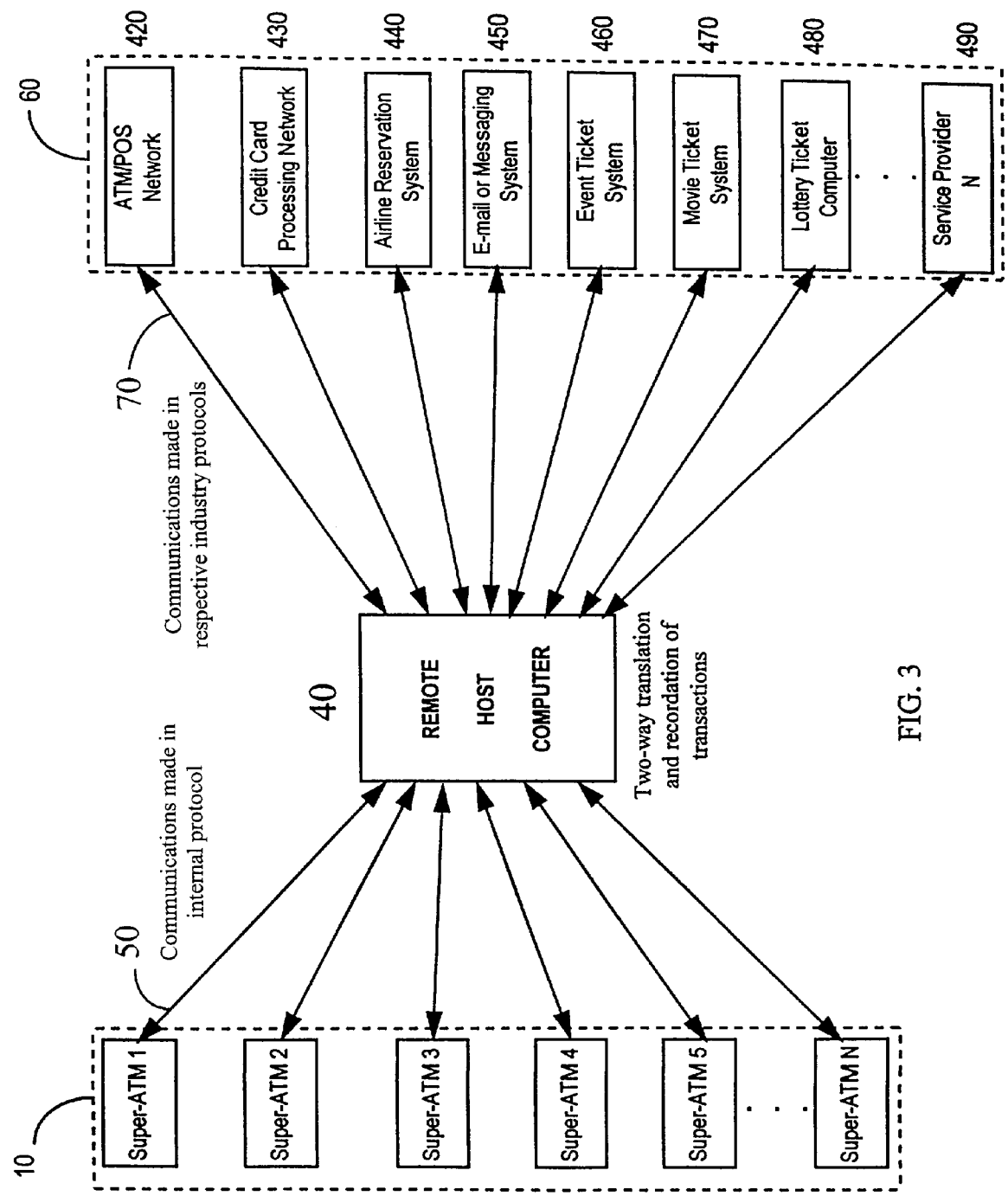
FIG. 3 shows a functional block diagram of a host computer managing the transactions of a number of Super-ATM machines with a number of service providers in accordance with a preferred embodiment of the present invention.

FIG. 3 shows a functional block diagram of a host computer 40 managing the transactions of a number of Super-ATM machines 10 with a number of service providers 60 in accordance with a preferred embodiment of the present invention. As shown, each Super-ATM has two-way communication with the remote host computer 40. The host computer 40 in turn has two way communication with a plurality of remote terminals 60. For illustrative purposes, these remote terminals 60 have been labeled in FIG. 3 with names representative of likely remote terminals that would be contacted by the host computer. For example, the remote terminal ATM/POS 420 represents a known banking network which currently supports automatic teller machine and point of sale transactions. This network would be contacted to verify and obtain funds and to make deposits. A credit card processing network 430 is utilized to verify and process credit card transactions. Other systems which the host computer 40 may interface/interact with includes an airline reservation system 440, an E-mail or Messaging system 450, an event ticket system 460, a movie ticket system 470, a lottery ticket computer 480, as well as other service provider applications 490.

In a typical transaction, the Super-ATM PC would prompt the user for information on the desired transaction. The Super-ATM PC would then transmit this information to the host computer. The host computer 40 would format the transaction in the appropriate industry-standard protocol, then contact the appropriate remote terminal. The data received back from the remote terminal would be processed by the host computer 40, formatted for a Super-ATM PC, and relayed back to the appropriate Super-ATM PC. This series of communication steps between a Super-ATM, the host and one or more remote terminals may be carried out several times for each transaction. For example, in purchasing an event ticket, the Super-ATM would first have to send reservation data. If the user were paying partially with coins and partially with an additional payment, the additional payment information would be sent to the host to be verified and obtained. Finally, the financial transaction would have to be completed to pay for the tickets.

In addition to processing transactions, the host computer may be used to monitor the individual Super-ATMs. On a scheduled interval, the Super-ATMs may transmit data regarding amount of coins stored, amount of currency received, level of paper or ticket stock, or other diagnostic and maintenance information to the host computer. The host may also initiate contact with the individual Super-ATM PCs, polling for data such as when components need service based on their use. The host may then evaluate the priority of service requirements for each Super-ATM, and schedule technicians accordingly. If the host finds that service is required, it may initiate a service call through an e-mail message to a paging service, which in turn pages a technician. Until the e-mail is acknowledged, the host will continue to send the service requests. The technician who responds to the page and services the unit enters a response in a two-way pager to signify who performed the service and what work was done. A technician can also initiate a diagnostic test through a two-way pager message, which is relayed by e-mail to the host, with the host instructing the Super-ATM PC to begin a diagnostic program or initiate any host-controllable machine function required by a technician.

In another embodiment, each Super-ATM PC could be networked to a single host, or each Super-ATM could be completely independent, originating its own communications to third parties to effect transactions. Reference to contacting a remote terminal include both the Super-ATM PC contacting a host, and the host contacting a remote terminal, or the Super-ATM PC contacting a remote terminal directly.

In a preferred networked environment, each Super-ATM PC would send transaction instructions to the host computer 40. The host computer 40 would translate these instructions to the appropriate protocol, contact the third party, receive the information, translate into a new format if necessary, then transmit the information to the appropriate Super-ATM PC. In a non-networked environment, the individual Super-ATM PC would communicate directly with third parties, and perform all necessary protocol translations itself.

In another embodiment, instructions to third parties could be batch-processed rather than communicated in real time. The functioning of the Super-ATM would be the same, except that communications to the host or third party would be made at scheduled intervals, communicating all transactions in a single batch. An alternative to this would be a delayed batch process, where the communications are stored by each Super-ATM PC, either internally or on removable storage media. A technician would periodically download or remove the data from each Super-ATM PC for processing.

Although the Super-ATM can perform conventional ATM functions, an embodiment of the invention does not necessarily have to perform conventional ATM functions. The Super-ATM is more general than conventional ATMs. The Super-ATM can be better thought of as an Automated Transaction Machine rather than as an Automated Teller Machine. An alternative embodiment of the invention may not take deposits, but may dispense tickets based on user-supplied information. Yet, another alternative embodiment of the invention may not dispense nor take cash, but may be used only to supply information based on the identity of the user.

In a preferred embodiment of the present invention, a Super-ATM network is configured with a client/server structure, wherein a Super-ATM is the client and the host is the server. A terminal driver within the host is the interface between a Super-ATM and a messaging engine within the host. The terminal driver takes a messages it receives from a Super-ATM and formats the message into a messaging engine format. The messaging engine processes and keeps track of all of the received messages. The messaging engine takes the incoming message and adds information such as status information, time stamps, etc. to the message and creates an outgoing message in messaging engine format to be further translated into formats required by industry computer systems 60 as needed.

The messaging engine can do distributed transaction processing. It can receive messages from multiple terminals. It can receive messages from multiple platforms, i.e., terminals, which have different computer systems, operating systems, and databases. The messaging engine takes action appropriate to the message received. The messaging engine creates actions for the transaction.

The messaging engine supports the execution of the transactions required by the messages. The messaging engine software manages incoming messages, interprets messages, and creates messages to be sent to industry computer systems 60 and service providers. The messaging engine processes the incoming messages from a Super-ATM and creates message(s), which will result in the intended service provider executing the transaction indicated in the incoming message.

A workflow processor, also within the host computer, drives the messaging engine into asychronous processing. The workflow processor is the controller of the messages. It determines the path of the message, the databases accessed, and the networks accessed. The workflow processor accesses databases as required by an incoming message.

A host interface exists for each network that is connected to the host. The interface between the workflow processor and the networks converts the workflow processor output format into the format required by a network.

The workflow processor processes messages asynchronously. When a message is received at the host, it parses the message and begins to undertake all actions dictated by the message. These actions are initiated simultaneously and executed in parallel to whatever extent possible. For example, all actions which have no dependencies can be processed at once. This includes writing certain data to databases, initiating a balance authorization if payment is being made using a card, carrying out the transaction event if payment was made in cash, etc. Then all events, which have dependencies which were already processed, are processed, such as notifying various networks that a transaction has taken place, etc. Events which have the same dependency level do not need to wait for each other to complete before they begin; they are initiated simultaneously. E.g., if responses from two networks are needed to complete a transaction and a first network takes 8 seconds to respond and a second network takes 5 seconds to respond, the transaction does not have to take 13 seconds to complete, but only needs 8 seconds to complete as these events were initiated at the same time.

The workflow processor does multi-threading and multi-state processing. The workflow processor executes different parts of the host software, simultaneously, in order to perform non-dependent events simultaneously. The host software executes all the threads that can run at the same time without interfering with each other. Events are triggered by the incoming messages and have states determined by their dependencies. Thus, an event may have many states. An event goes from an initial state to a final state. In the regressive case, where an event has only one state, the initial state is the final state. In between the initial state and the final state, an event can be suspended and desuspended depending on the state of other events from which it depends.

The host does message translations to interface networks that have not been interfaced before. An example of this is using iris scanning as a substitute for PIN numbers on ATM transactions. Since legacy networks (transaction processors such as EDS, Deluxe, etc.) do not have protocols that can pass iris data to a card issuer, and since card issuers do not have databases that contain customer iris information, iris recognition is implemented as follows: A customer "enrolls" into the iris system at a kiosk, store or bank branch that has the iris camera connected to the Super-ATM host. The customer swipes an ATM card and enters his regular PIN number at the time that his iris scan is performed. Both the iris data and the PIN number is transferred to the host and stored.

Then, when the enrolled customer uses an iris-enabled Super-ATM or other terminal, the message is routed to the host and compared to the iris record in the host database. If there is a match, then the corresponding PIN record (encrypted as required by the ATM networks) is obtained and passed to an ATM network as if it were a normal ATM transaction. The transaction completes as usual and appears to the ATM network like any other ATM transaction. As networks and issuers begin to support iris data themselves, the iris data can be passed automatically without translating the iris data to a PIN number. The host computer can determine whether to automatically transfer the iris data or to pass PIN data to the ATM network, thereby making an iris-enabled machine universally functional during the transition.

Existing ATMs produced by other manufacturers can be retrofitted with new software or firmware with or without additional hardware enabling the older ATMs to perform some or all Super-ATM functions and communicate on a Super-ATM network.

It is apparent from the foregoing that embodiments of the present invention satisfies an immediate need for a multi-transactional ATM machine. This Super-ATM machine may be embodied in other specific forms and can be used with a variety of remote terminals without departing from the spirit or essential attributes of the present invention. It is therefore desired that the described embodiments be considered in all respects as illustrative and not restrictive.

What is claimed is:

1. A transaction network, comprising:
   a first service provider responsive to a message having a first format;
   a second service provider responsive to a message having a second format different from said first format; and
   a transaction terminal adapted to communicate with the first service provider with the first formatted message in response to a first user input, and with the second service provider with the second formatted message in response to a second user input.

2. The transaction network of claim 1 wherein said first service provider comprises a banking network, said second service provider comprises a non-banking network, and said transaction terminal is adapted to dispense money in response to the first user input.

3. The transaction network of claim 1 further comprising a third service provider responsive to a message having a third format different from said first and second formats, and wherein said transaction terminal communicates with both the second service provider using the second formatted message and the third service provider using the third formatted message in response to the second user input.

4. The transaction network of claim 1 further comprising a processor adapted to convert the first user input into the first formatted message, and convert the second user input into the second formatted message.

5. The transaction network of claim 4 wherein the processor is included within the transaction terminal.

6. The transaction network of claim 4 wherein the processor comprises a host computer remote from said transaction terminal.

7. The transaction network of claim 6 wherein said processor further comprising a workflow processor that processes and controls said first and second messages from said transaction terminal asynchronously.

8. The transaction network of claim 7 wherein the workflow processor processes and controls said first and second messages in at least one of a multi-threading and multi-state processing manner.

9. The transaction network of claim 1 wherein said transaction terminal further comprises a multimedia printer adapted to generate printed media in response to the first user input.

10. The transaction network of claim 1 wherein said transaction terminal further comprises a sensor adapted to extract identification information in response to one of said first and second user inputs.

11. The transaction network of claim 10 wherein one of said first and second formatted messages comprises the identification information in response to the respective user input.

12. The transaction network of claim 10 wherein said sensor comprises a magnetic ink character recognition reader.

13. The transaction network of claim 10 wherein said sensor comprises a validator.

14. The transaction network of claim 10 wherein said sensor comprises a biometric system.

15. The transaction network of claim 10 wherein said sensor comprises a signature pad.

16. The transaction network of claim 10 wherein said sensor comprises an optical character recognition scanner.

17. The transaction network of claim 1 wherein said transaction terminal further comprises a product multimedia dispenser adapted to dispense a multimedia product in response to the first user input.

18. The transaction network of claim 1 wherein said transaction terminal further comprises a card dispenser adapted to dispense a card in response to the first user input.

19. The transaction network of claim 1 wherein at least one of the first and second formatted messages includes user identification information.

20. The transaction network of claim 19 wherein the user identification information is based upon user input at said transaction terminal.

21. The transaction network of claim 20 wherein the user input further comprises biometric information.

22. An transaction network, comprising:
   a first service provider responsive to a message having a first format;
   a second service provider responsive to a message having a second format different from said first format; and
   a transaction terminal adapted to communicate with both the first service provider with the first formatted message and the second service provider with the second formatted message in response to a first user input.

23. The transaction network of claim 22 wherein said first service provider comprises a banking network, said second service provider comprises a non-banking network.

24. The transaction network of claim 22 wherein said transaction terminal further comprises a product multimedia dispenser adapted to dispense a multimedia product in response to the first user input.

25. The transaction of claim 22 wherein said transaction terminal further comprises a card dispenser adapted to dispense a card in response to the first user input.

26. The transaction network of claim 22 wherein said transaction terminal further comprises a multimedia printer adapted to generate printed media in response to the first user input.

27. The transaction network of claim 22 wherein said transaction terminal further comprises a sensor adapted to extract identification information in response to one of said first and second user inputs.

28. The transaction network of claim 27 wherein said one of said first and second formatted messages comprises the identification information in response to the respective user input.

29. The transaction network of claim 27 wherein said sensor comprises a magnetic ink character recognition reader.

30. The transaction network of claim 27 wherein said sensor comprises a validator.

31. The transaction network of claim 27 wherein said sensor comprises a biometric system.

32. The transaction network of claim 27 wherein said sensor comprises a signature pad.

33. The transaction network of claim 27 wherein said sensor comprises an optical character recognition scanner.

34. The transaction network of claim 22 further comprising a third service provider responsive to a message having a third format different from said first and second formats, and wherein said transaction terminal communicates with the third service provider using the third formatted message in response to a second user input.

35. The transaction network of claim 34 wherein said third service provider comprises a banking network, and said transaction terminal is adapted to dispense money in response to the second user input.

36. The transaction network of claim 22 further comprising a processor adapted to convert the first user input into the first formatted message, and convert the second user input into the second formatted message.

37. The transaction network of claim 36 wherein the processor is included within the transaction terminal.

38. The transaction network of claim 36 wherein the processor comprises a host computer remote from said transaction terminal.

39. A transaction terminal, comprising:
   a data entry device for selecting between plural requests, said data entry device providing respective outputs responsive to each of the plural requests;
   a processor for formatting a message in response to the output, said formatted message comprising the selected message; and at least one of:
      a product multimedia dispenser for dispensing a multimedia product corresponding to a first one of the plural requests;
      a card dispenser for dispensing a card corresponding to a second one of the plural requests; and
      a multimedia printer for generating printed media corresponding to a third one of the plural requests.

40. The transaction terminal of claim 39, further comprising a sensor for extracting identification information in response to the selected request, wherein said sensor is selected from the group consisting of a magnetic ink character recognition reader, a validator, a biometric system, a signature pad, and an optical character recognition scanner.

41. A method for performing a transaction with one of a plurality of service providers from single transaction terminal, each of the service providers being responsive to a message having a format different than the other service providers, said method comprising the steps of:
   inputting a request into the transaction terminal from a user;
   sensing, at the transaction terminal, identification information;
   confirming the identification information;
   selecting, at the transaction terminal, a service offered by one of the service providers in response to the request if said identification information is confirmed;
   converting the request into a message having the format for said one of the selected service providers if said identification information is confirmed; and transmitting the formatted message to said one of the selected service providers if said identification information is confirmed.

42. A method for performing transactions with at least one of a plurality of destination computers from a transaction terminal through a host computer, each of the destination computers communicating with said transaction terminal via said host computer, said method comprising the steps of:

receiving at least one transaction request from a user through said transaction terminal;

providing a transaction request message to said host reflecting said at least one transaction request;

parsing said transaction request message into plural transaction components corresponding to respective ones of said plurality of destination computers;

identifying dependencies between said plural transaction components; and communicating with said plurality of destination computers in an order defined at least in part by said dependencies.

43. The method of claim 42, wherein said communicating step further comprises communicating with said plurality of destination computers using a communication protocol unique to each corresponding destination computer.

44. The method of claim 42, wherein said communicating step further comprises communicating with at least two of said plurality of destination computers simultaneously.

45. The method of claim 42, wherein said communicating step further comprises communicating with at least two of said plurality of destination computers asynchronously.

46. The method of claim 42, further comprising the steps of sensing identification information of said user and confirming the identification information.

47. A transaction network, comprising:

at least one transaction terminal having a user interface responsive to user inputs to initiate and conduct transactions with a plurality of destination computers; and a host computer connected to said at least one transaction terminal through a communication network, said host computer being further connected to said plurality of destination computers over separate communication networks, said host computer parsing a transaction message received from said at least one transaction terminal into plural transaction components corresponding to respective ones of said plurality of destination computers, and communicating with said plurality of destination computers in an order defined at least in part by dependencies between said plural transaction components.

48. The transaction network of claim 47, wherein at least one of said plurality of destination computers further comprises a banking network.

49. The transaction network of claim 47, wherein at least one of said plurality of destination computers further comprises a non-banking network.

50. The transaction network of claim 47, wherein said plural transaction components are executed simultaneously and independently by said host computer.

51. The transaction network of claim 47, wherein said host computer communicates with said plurality of destination computers using respective communication protocols unique to each of said destination computers.

* * * * *